United States Patent
Ecoff et al.

(10) Patent No.: US 7,599,009 B2
(45) Date of Patent: Oct. 6, 2009

(54) APPARATUS AND METHOD FOR PROCESSING ANALOG AND DIGITAL SIGNALS FROM MULTIPLE SIGNAL SOURCES

(75) Inventors: Clint Alan Ecoff, Indianapolis, IN (US); Gary Dean Grubbs, Indianapolis, IN (US); Daniel Mark Hutchinson, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 497 days.

(21) Appl. No.: 10/564,428

(22) PCT Filed: Jul. 8, 2004

(86) PCT No.: PCT/US2004/021800

§ 371 (c)(1),
(2), (4) Date: Jan. 11, 2006

(87) PCT Pub. No.: WO2005/009033

PCT Pub. Date: Jan. 27, 2005

(65) Prior Publication Data

US 2006/0181651 A1    Aug. 17, 2006

Related U.S. Application Data

(60) Provisional application No. 60/487,213, filed on Jul. 14, 2003.

(51) Int. Cl.
*H04N 5/268* (2006.01)
*H04N 5/50* (2006.01)

(52) U.S. Cl. .................. 348/731; 348/726; 348/725; 348/555

(58) Field of Classification Search ................. 348/678, 348/554–558, 705, 706, 725, 726, 731, 732
See application file for complete search history.

(56) References Cited

U.S. PATENT DOCUMENTS 5,557,617 A * 9/1996 Belcher et al. ............. 370/316

(Continued)

FOREIGN PATENT DOCUMENTS

EP    0905973    3/1999

(Continued)

OTHER PUBLICATIONS

Search Report dated Oct. 21, 2004.

*Primary Examiner*—M. Lee
(74) *Attorney, Agent, or Firm*—Robert D. Shedd; Joseph J. Opalach; Brian J. Cromarty

(57) ABSTRACT

An apparatus such as a television signal receiver employs an efficient and cost-effective signal processing architecture which enables, among other things, the reception and processing of both analog and digital signals from multiple signal sources, such as but not limited to, terrestrial and cable signal sources. According to an exemplary embodiment, the apparatus includes a first tuner operative to generate a first IF signal corresponding to a first RF signal. A first demodulator is operative to generate a first demodulated signal corresponding to the first IF signal. A second tuner is operative to generate a second IF signal corresponding to a second RE signal. A second demodulator is operative to generate a second demodulated signal corresponding to the second IF signal. A third demodulator is operative to generate a third demodulated signal corresponding to one of the first and second IF signals.

11 Claims, 2 Drawing Sheets

U.S. PATENT DOCUMENTS

Figure 1:
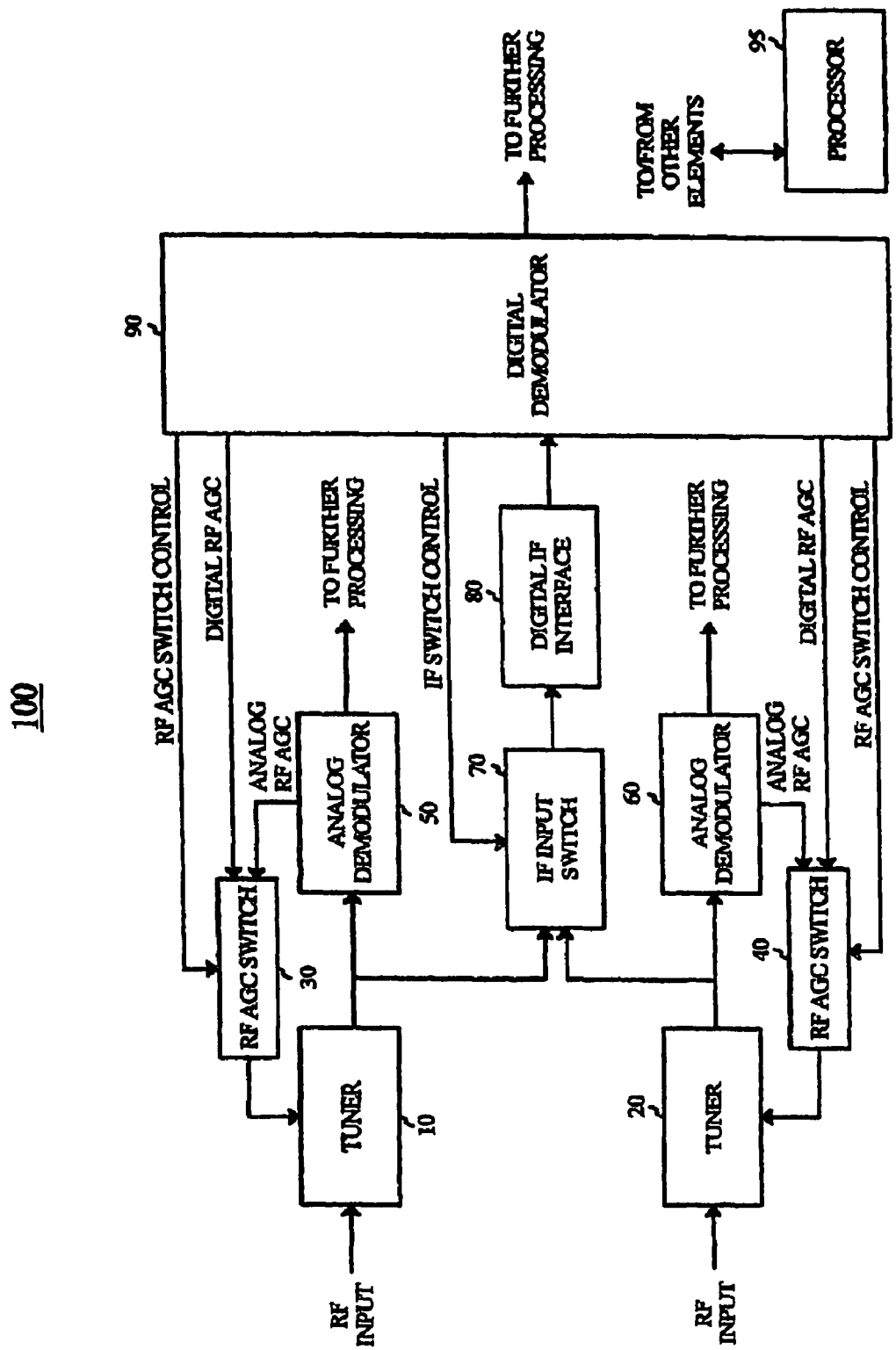

| | | | |
|---|---|---|---|
| 5,926,228 A * | 7/1999 | Jeon et al. | 348/554 |
| 6,091,458 A | 7/2000 | Jeon et al. | |
| 6,147,713 A | 11/2000 | Robbins et al. | |
| 7,034,898 B1 | 4/2006 | Zahm et al. | |
| 7,428,022 B2 * | 9/2008 | Teichner et al. | 348/725 |
| 2002/0008787 A1 | 1/2002 | Kurihara | |

FOREIGN PATENT DOCUMENTS

| | | |
|---|---|---|
| EP | 1126632 | 8/2001 |
| GB | 2 257 605 A | 1/1993 |
| WO | 95/12262 | 5/1995 |
| WO | WO 00/64050 | 10/2000 |

* cited by examiner

APPARATUS AND METHOD FOR PROCESSING ANALOG AND DIGITAL SIGNALS FROM MULTIPLE SIGNAL SOURCES

This application claims the benefit, under 35 U.S.C. 365 of International Application PCT/US2004/021800, filed Jul. 8, 2004 which was published in accordance with PCT Article 21(2) on Jan. 27, 2005 in English and which claims the benefit of U.S. provisional patent application No. 60/487/213 filed Jul. 14, 2003.

The present invention generally relates to a signal processing architecture for apparatuses such as television signal receivers, and more particularly, to an efficient and cost-effective signal processing architecture which enables, among other things, the reception and processing of both analog and digital signals from multiple signal sources, such as but not limited to, terrestrial and cable signal sources.

Apparatuses such as television signal receivers may be capable of receiving and processing both analog signals and digital signals. To accommodate both analog and digital signal processing, such apparatuses may use one tuner and demodulator for analog signals, and another tuner and demodulator for digital signals. Additionally, in order to accommodate signals from multiple signal sources (e.g., terrestrial, cable, satellite, internet, etc.), a dedicated tuner and demodulator would be required for each signal source. This type of architecture in which a dedicated tuner and demodulator is used for each signal type (i.e., analog and digital) and each signal source is generally undesirable in view of manufacturing cost, part count, power consumption, and operational reliability of the entire apparatus circuitry.

Accordingly, there is a need for a more efficient and cost-effective signal processing architecture for apparatuses such as television signal receivers which is thereby capable of receiving and processing both analog and digital signals from multiple signal sources. The present invention addresses these and/or other issues.

In accordance with an aspect of the present invention, signal processing apparatus is disclosed. According to an exemplary embodiment, the signal processing apparatus comprises first tuning means for generating a first IF signal corresponding to a first RF signal. First demodulating means generates a first demodulated signal corresponding to the first IF signal. Second tuning means generates a second IF signal corresponding to a second RF signal. Second demodulating means generates a second demodulated signal corresponding to the second IF signal. Third demodulating means generates a third demodulated signal corresponding to one of the first and second IF signals.

In accordance with another aspect of the present invention, a method for performing signal processing is disclosed. According to an exemplary embodiment, the method comprises receiving a first RF signal from a first signal source, generating a first IF signal corresponding to the first RF signal responsive to a first channel selection, generating a first demodulated signal corresponding to the first IF signal if the first channel selection is an analog channel selection, receiving a second RF signal from a second signal source, generating a second IF signal corresponding to the second RF signal responsive to a second channel selection, generating a second demodulated signal corresponding to the second IF signal if the second channel selection is an analog channel selection, and generating a third demodulated signal corresponding to one of the first and second IF signals if one of the first and second channel selections is a digital channel selection.

In accordance with still another aspect of the present invention, a television signal receiver is disclosed. According to an exemplary embodiment, the television signal receiver comprises a first tuner operative to generate a first IF signal corresponding to a first RF signal. A first demodulator is operative to generate a first demodulated signal corresponding to the first IF signal. A second tuner is operative to generate a second IF signal corresponding to a second RF signal. A second demodulator is operative to generate a second demodulated signal corresponding to the second IF signal. A third demodulator is operative to generate a third demodulated signal corresponding to one of the first and second IF signals.

Figure 2:
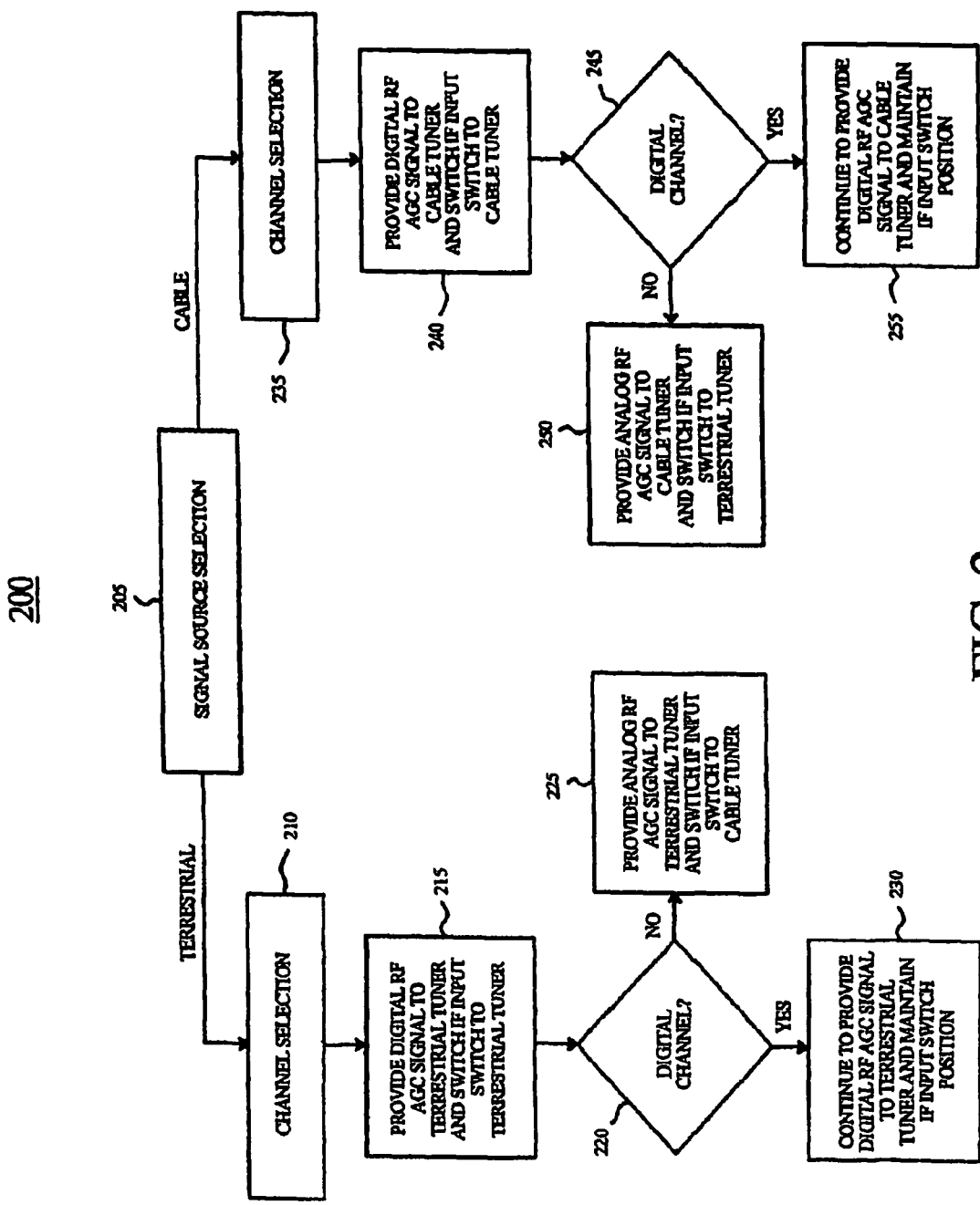

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a block diagram of signal processing apparatus according to an exemplary embodiment of the present invention; and FIG. 2 is a flowchart illustrating steps according to an exemplary embodiment of the present invention.

The exemplifications set out herein illustrate preferred embodiments of the invention, and such exemplifications are not to be construed as limiting the scope of the invention in any manner.

Referring now to the drawings, and more particularly to FIG. 1, signal processing apparatus 100 according to an exemplary embodiment of the present invention is shown. Signal processing apparatus 100 may for example represent the front-end processing circuitry of a receiving device such as television signal receiver and/or other device. As shown in FIG. 1, signal processing apparatus 100 comprises first tuning means such as tuner 10, second tuning means such as tuner 20, first radio frequency (RF) automatic gain control (AGC) switching means such as RF AGC switch 30, second RF AGC switching means such as RF AGC switch 40, first demodulating means such as analog demodulator 50, second demodulating means such as analog demodulator 60, intermediate frequency (IF) switching means such as IF input switch 70, IF interface means such as digital IF interface 80, third demodulating means such as digital demodulator 90, and processing means such as processor 95. The elements of FIG. 1 may be embodied using integrated circuits (ICs), and some elements may for example be included on one or more ICs. For clarity of description, certain elements associated with signal processing apparatus 100 such as certain control signals, power signals and/or other elements may not be shown in FIG. 1.

Tuner 10 is operative to perform a signal tuning function for signals provided from a first signal source, such as a terrestrial (i.e., air) or other signal source. According to an exemplary embodiment, tuner 10 receives a first RF input signal from the first signal source and performs the signal tuning function by filtering and frequency downconverting (i.e., single or multiple stage downconversion) the first RF input signal to thereby generate a first IF signal. The first RF input signal and first IF signal may include audio, video and/or data content, and may be of an analog modulation scheme (e.g., NTSC, PAL, SECAM, etc.) or a digital modulation scheme (e.g., ATSC, QAM, etc.).

Tuner 20 is operative to perform a signal tuning function for broadcast signals provided from a second signal source, such as a cable or other signal source. According to an exemplary embodiment, tuner 20 receives a second RF input signal from the second signal source and performs the signal tuning function by filtering and frequency downconverting (i.e., single or multiple stage downconversion) the second RF input signal to thereby generate a second IF signal. The second input RF signal and second IF signal may also include audio, video and/or data content, and may be of an analog modulation scheme (e.g., NTSC, PAL, SECAM, etc.) or a digital modulation scheme (e.g., ATSC, QAM, etc.).

RF AGC switch 30 is operative to perform an AGC switching function for tuner 10. According to an exemplary embodiment, RF AGC switch 30 is operative to provide tuner 10 either an RF AGC signal from analog demodulator 30 or an RF AGC signal from digital demodulator 90 responsive to an RF AGC switch control signal provided from digital demodulator 90 or other source.

RF AGC switch 40 is operative to perform an AGC switching function for tuner 20. According to an exemplary embodiment, RF AGC switch 40 is operative to provide tuner 20 either an RF AGC signal from analog demodulator 60 or an RF AGC signal from digital demodulator 90 responsive to an RF AGC switch control signal provided from digital demodulator 90 or other source.

Analog demodulator 50 is operative to perform functions including analog demodulation and analog RF AGC functions. According to an exemplary embodiment, analog demodulator 50 is operative to demodulate the first IF signal provided from tuner 10 to thereby generate a first demodulated analog signal. Analog demodulator 50 is operative to demodulate one or more types of analog modulated signals (e.g., NTSC, PAL, SECAM, etc.). As indicated in FIG. 1, the first demodulated analog signal output from analog demodulator 50 may be provided for further processing (e.g., decoding, etc.). Also according to an exemplary embodiment, analog demodulator 50 provides a first analog RF AGC signal to RF AGC switch 30 responsive to the first IF signal. The first analog AGC signal facilitates the particular RF AGC delay point and AGC voltage required by tuner 10. Analog demodulator 50 may for example be embodied as a synchronous phase locked loop (PLL) type demodulator.

Analog demodulator 60 is operative to perform functions including analog demodulation and analog RF AGC functions. According to an exemplary embodiment, analog demodulator 60 is operative to demodulate the second IF signal provided from tuner 20 to thereby generate a second demodulated analog signal. Analog demodulator 60 is operative to demodulate one or more types of analog modulated signals (e.g., NTSC, PAL, SECAM, etc.). As indicated in FIG. 1, the second demodulated analog signal output from analog demodulator 60 may be provided for further processing (e.g., decoding, etc.). Also according to an exemplary embodiment, analog demodulator 60 provides a second analog RF AGC signal to RF AGC switch 40 responsive to the second IF signal. The second analog AGC signal facilitates the particular RF AGC delay point and AGC voltage required by tuner 20. Analog demodulator 60 may also for example be embodied as a synchronous phase locked loop (PLL) type demodulator.

IF input switch 70 is operative to perform an IF switching function. According to an exemplary embodiment, IF switch 70 selectively passes either the first IF signal provided from tuner 10 or the second IF signal provided from tuner 20 responsive to an IF switch control signal provided from digital demodulator 90.

Digital IF interface 80 is operative to perform functions including filtering and signal amplification functions. According to an exemplary embodiment, digital IF interface 80 includes one or more surface acoustical wave (SAW) filters and signal amplifiers that filter and amplify the first IF signal or the second IF signal provided from IF input switch 70 to generate a filtered IF signal.

Digital demodulator 90 is operative to perform functions including analog-to-digital (A/D) conversion, digital demodulation, digital AGC, and switch control functions. According to an exemplary embodiment, digital demodulator 90 is operative to convert the filtered IF signal provided from digital IF interface 80 to a digital IF signal. Digital demodulator 90 then demodulates the digital IF signal to thereby generate a demodulated digital signal that corresponds to either the first IF signal provided from tuner 10 or the second IF signal provided from tuner 20. Digital demodulator 90 is operative to demodulate one or more types of digitally modulated signals (e.g., ATSC, QAM, etc.). As indicated in FIG. 1, the demodulated digital signal output from digital demodulator 90 may be provided for further processing (e.g., decoding, etc.). Also according to an exemplary embodiment, digital demodulator 90 provides first and second digital RF AGC signals and first and second RF AGC switch control signals to RF AGC switches 30 and 40, respectively, under the control of processor 95. The first and second digital AGC signals facilitate the particular RF AGC delay points and AGC voltages required by tuners 10 and 20, respectively. Digital demodulator 90 also provides an IF switch control signal to IF input switch 70 under the control of processor 95. Digital demodulator 90 may for example be embodied using an IC such as a BCM3510 model IC manufactured by Broadcom, or an NXT2003 model IC manufactured by ATI.

Processor 95 is operative to perform various functions including processing, control and memory functions associated with signal processing apparatus 100. According to an exemplary embodiment, processor 95 is operative to perform functions including, but not limited to, detecting and processing user inputs such as signal source and channel selection inputs, detecting channel types (e.g., analog versus digital), and processing and providing control signals to enable channel tuning, switching, memory, and other functions.

Signal processing apparatus 100 can be used in various ways according to the present invention. According to an exemplary embodiment, signal processing apparatus 100 can be used to provide a picture-in-picture (PIP), picture-outside-picture (POP) or similar function which provides a plurality of displays simultaneously. For example, tuner 10 or 20 can tune a signal for a first picture (e.g., a main picture) while the other tuner 10 or 20 can tune a signal for a second picture (e.g., a sub-picture or PIP). In this manner, one of the pictures may be represented by an analog modulated signal which is demodulated by analog demodulator 50 or 60, while the other picture may be represented by a digitally modulated signal which is demodulated by digital demodulator 90. Alternatively, both pictures may be represented by analog modulated signals which are demodulated by analog demodulators 50 and 60.

To facilitate a better understanding of the present invention, an example will now be provided. Referring to FIG. 2, a flowchart 200 illustrating steps according to an exemplary embodiment of the present invention is shown. For purposes of example and explanation, the steps of FIG. 2 will be described with reference to signal processing apparatus 100 of FIG. 1. The steps of FIG. 2 are merely exemplary, and are not intended to limit the present invention in any manner.

At step 205, a signal source for signal processing apparatus 100 is selected. According to an exemplary embodiment, a desired signal source such as a terrestrial, cable or other signal source may be selected at step 205 in response to a user input to signal processing apparatus 100 via a user input device (not shown in FIG. 1) such as a hand-held remote control device, integrated key panel, wired and/or wireless keyboard, and/or other input device. The user input causes signal processing apparatus 100 to switch its active input to a particular signal source. For purposes of example and explanation, FIG. 2 is described with the assumption that the user may select either a terrestrial signal source or a cable signal source. However, other types of signal sources, such as satellite, Internet, or other signal sources may also be selected according to the present invention. Also for purposes of example and explanation, FIG. 2 is described with the assumption that tuner 10 of FIG. 1 is used to tune terrestrial signals and tuner 20 is used to tune cable signals. This assumption, however, is not intended to limit the present invention in any manner, and tuners 10 and 20 could be used to tune analog and/or digital signals from other signal sources.

If a terrestrial signal source is selected at step 205, process flow advances to step 210 where a terrestrial channel is selected by the user. According to an exemplary embodiment, the channel selection occurs at step 210 in response to a user channel selection input to signal processing apparatus 100 via a user input device (not shown in FIG. 1) such as a hand-held remote control device, integrated key panel, wired and/or wireless keyboard, and/or other input device. Also according to an exemplary embodiment, the user channel selection at step 210 causes tuner 10 to begin tuning the selected terrestrial channel.

At step 215, a digital RF AGC signal is provided to the terrestrial tuner and IF input switch 70 is switched to the terrestrial tuner. As previously indicated herein, it is assumed for purposes of example and explanation in FIG. 2 that tuner 10 of FIG. 1 is used to tune terrestrial signals and thereby represents the terrestrial tuner. According to an exemplary embodiment, digital demodulator 90 provides the first digital RF AGC signal and the first RF AGC switch control signal to RF AGC switch 30 under the control of processor 95 which thereby causes RF AGC switch 30 to provide the first digital RF AGC signal to tuner 10 at step 215. Also according to an exemplary embodiment, digital demodulator 90 provides the IF switch control signal to IF input switch 70 under the control of processor 95 which causes IF input switch 70 to switch to tuner 10 at step 215. Accordingly, step 215 enables signal processing apparatus 100 to receive and detect a digital terrestrial channel signal.

At step 220, a determination is made as to whether the terrestrial channel selected at step 210 is a digital channel. According to an exemplary embodiment, processor 95 is programmed to make the determination at step 220 responsive to a control signal provided from digital demodulator 90 which indicates whether digital demodulator 90 is able to obtain a demodulation lock on a valid digital channel signal. Other ways of determining whether the selected terrestrial channel is a digital channel may also be used at step 220 according to the present invention.

If the determination at step 220 is negative, process flow advances to step 225 where an analog RF AGC signal is provided to the terrestrial tuner and IF input switch 70 is switched to the cable tuner. As previously indicated herein, it is assumed for purposes of example and explanation in FIG. 2 that tuner 10 of FIG. 1 is used to tune terrestrial signals and thereby represents the terrestrial tuner, while tuner 20 is used to tune cable signals and thereby represents the cable tuner. According to an exemplary embodiment, analog demodulator 50 provides the first analog RF AGC signal to RF AGC switch 30 and digital demodulator 90 provides the first RF AGC switch control signal to RF AGC switch 30 under the control of processor 95 which thereby causes RF AGC switch 30 to provide the first analog RF AGC signal to tuner 10 at step 225.

Also according to an exemplary embodiment, digital demodulator 90 provides the IF switch control signal to IF input switch 70 under the control of processor 95 which causes IF input switch 70 to switch to tuner 20 at step 225. In this manner, IF input switch 70 is switched away from the terrestrial tuner, namely tuner 10, at step 225 which advantageously prevents signal disturbance attributable to the input characteristics of digital IF interface 80.

If the determination at step 220 is positive, process flow advances to step 230 where the digital RF AGC signal continues to be provided to the terrestrial tuner and IF input switch 70 maintains its position. According to an exemplary embodiment, digital demodulator 90 continues to provide the first digital RF AGC signal to tuner 10 via RF AGC switch 30 and maintains the position of IF input switch 70 switched to tuner 10 at step 230.

Referring now back to step 205, if a cable signal source is selected, process flow advances to step 235 where a cable channel is selected by the user. According to an exemplary embodiment, the channel selection occurs at step 235 in response to a user channel selection input to signal processing apparatus 100 via a user input device (not shown in FIG. 1) such as a hand-held remote control device, integrated key panel, wired and/or wireless keyboard, and/or other input device. Also according to an exemplary embodiment, the user channel selection at step 235 causes tuner 20 to begin tuning the selected cable channel.

At step 240, a digital RF AGC signal is provided to the cable tuner and IF input switch 70 is switched to the cable tuner. As previously indicated herein, it is assumed for purposes of example and explanation in FIG. 2 that tuner 20 of FIG. 1 is used to tune cable signals and thereby represents the cable tuner. According to an exemplary embodiment, digital demodulator 90 provides the second digital RF AGC signal and second first RF AGC switch control signal to RF AGC switch 40 under the control of processor 95 which thereby causes RF AGC switch 40 to provide the second digital RF AGC signal to tuner 20 at step 240. Also according to an exemplary embodiment, digital demodulator 90 provides the IF switch control signal to IF input switch 70 under the control of processor 95 which causes IF input switch 70 to switch to tuner 20 at step 240. Accordingly, step 240 enables signal processing apparatus 100 to receive and detect a digital cable channel.

At step 245, a determination is made as to whether the cable channel selected at step 235 is a digital channel. According to an exemplary embodiment, processor 95 is programmed to make the determination at step 245 responsive to a control signal provided from digital demodulator 90 which indicates whether digital demodulator 90 is able to obtain a demodulation lock on a valid digital channel signal. Other ways of determining whether the selected terrestrial channel is a digital channel may also be used at step 245 according to the present invention.

If the determination at step 245 is negative, process flow advances to step 250 where an analog RF AGC signal is provided to the cable tuner and IF input switch 70 is switched to the terrestrial tuner. As previously indicated herein, it is assumed for purposes of example and explanation in FIG. 2 that tuner 10 of FIG. 1 is used to tune terrestrial signals and thereby represents the terrestrial tuner, while tuner 20 is used to tune cable signals and thereby represents the cable tuner. According to an exemplary embodiment, analog demodulator 60 provides the second analog RF AGC signal to RF AGC switch 40 and digital demodulator 90 provides the second RF AGC switch control signal to RF AGC switch 40 under the control of processor 95 which thereby causes RF AGC switch 40 to provide the second analog RF AGC signal to tuner 20 at step 250. Also according to an exemplary embodiment, digital demodulator 90 provides the IF switch control signal to IF input switch 70 under the control of processor 95 which causes IF input switch 70 to switch to tuner 10 at step 250. In this manner, IF input switch 70 is switched away from the cable tuner, namely tuner 20, at step 250 which advantageously prevents signal disturbance attributable to the input characteristics of digital IF interface 80.

If the determination at step 245 is positive, process flow advances to step 255 where the digital RF AGC signal continues to be provided to the cable tuner and IF input switch 70 maintains its position. According to an exemplary embodiment, digital demodulator 90 continues to provide the second digital RF AGC signal to tuner 20 via RF AGC switch 20 and maintains the position of IF input switch 70 switched to tuner 20 at step 255.

As described herein, the present invention provides an efficient and cost-effective signal processing architecture for apparatuses such as television signal receivers which enables, among other things, the reception and processing of both analog and digital signals from multiple signal sources, such as but not limited to, terrestrial and cable signal sources. The present invention may be applicable to various apparatuses, either with or without a display device. Accordingly, the phrases "signal processing apparatus" and "television signal receiver" as used herein may refer to systems or apparatuses including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. Signal processing apparatus, comprising:
 first tuning means for generating a first IF signal corresponding to a first RF signal;
 first analog demodulating means for generating a first demodulated signal and a first AGC signal corresponding to said first IF signal;
 second tuning means for generating a second IF signal corresponding to a second RF signal;
 second analog demodulating means for generating a second demodulated signal and a second AGC signal corresponding to said second IF signal;
 digital demodulating means for generating a third demodulated signal and a third AGC signal corresponding to one of said first and second IF signals;
 first RF AGC switching means for selectively providing one of said first and third AGC signals to said first tuning means; and
 second RF AGC switching means for selectively providing one of said second and third AGC signals to said second tuning means.

2. The signal processing apparatus of claim 1, wherein said first RF signal is provided via a terrestrial signal source.

3. The signal processing apparatus of claim 1, wherein said second RF signal is provided via a cable signal source.

4. The signal processing apparatus of claim 1, further comprising IF switching means for selectively providing one of said first and second IF signals to said third demodulating means.

5. A method for performing signal processing, comprising:
 receiving a first RF signal from a first signal source;
 generating a first IF signal corresponding to said first RF signal responsive to a first channel selection;
 generating a first demodulated signal and a first AGC signal corresponding to said first IF signal if said first channel selection is an analog channel selection; receiving a second RF signal from a second signal source;
 generating a second IF signal corresponding to said second RF signal responsive to a second channel selection;
 generating a second demodulated signal and a second AGC signal corresponding to said second IF signal if said second channel selection is an analog channel selection;
 generating a third demodulated signal and a third AGC signal corresponding to one of said first and second IF signals if one of said first and second channel selections is a digital channel selection
 selectively providing one of said first and third AGC signals for use in said generating a first IF signal; and
 selectively providing one of said second and third AGC signals for use in said generating a second IF signal.

6. The method of claim 5, wherein said first signal source is a terrestrial signal source.

7. The method of claim 5, wherein said second signal source is a cable signal source.

8. A television signal receiver, comprising:
 a first tuner operative to generate a first IF signal corresponding to a first RF signal;
 a first analog demodulator operative to generate a first demodulated signal and a first AGC signal corresponding to said first IF signal;
 a second tuner operative to generate a second IF signal corresponding to a second RF signal;
 a second analog demodulator operative to generate a second demodulated signal and a second AGC signal corresponding to said second IF signal;
 a digital demodulator operative to generate a third demodulated signal and a third AGC signal corresponding to one of said first and second IF signals;
 a first RF AGC switch operative to selectively provide one of said first and third AGC signals to said first tuner; and
 a second RF AGC switch operative to selectively provide one of said second and third AGC signals to said second tuner.

9. The television signal receiver of claim 8, wherein said first RF signal is provided via a terrestrial signal source.

10. The television signal receiver of claim 8, wherein said second RF signal is provided via a cable signal source.

11. The television signal receiver of claim 8, further comprising an IF switch operative to selectively provide one of said first and second IF signals to said third demodulator.

* * * * *

UNITED STATES PATENT AND TRADEMARK OFFICE
CERTIFICATE OF CORRECTION

| | | |
|---|---|---|
| PATENT NO. | : 7,599,009 B2 | Page 1 of 1 |
| APPLICATION NO. | : 10/564428 | |
| DATED | : October 6, 2009 | |
| INVENTOR(S) | : Ecoff et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Twenty-eighth Day of September, 2010

David J. Kappos
*Director of the United States Patent and Trademark Office*